United States Patent

Nagano et al.

[11] Patent Number: 5,150,045
[45] Date of Patent: Sep. 22, 1992

[54] ELECTRIC AUTOMOBILE

[75] Inventors: Toshihiro Nagano; Yasuaki Kyoukane, both of Omiya, Japan

[73] Assignee: Fuji Jukogyo Kabushiki Kaisha, Tokyo, Japan

[21] Appl. No.: 615,242

[22] Filed: Nov. 19, 1990

[30] Foreign Application Priority Data

Nov. 22, 1989 [JP] Japan ................................. 1-305009

[51] Int. Cl.$^5$ ............................................. H02J 7/00
[52] U.S. Cl. ........................................ 320/62; 320/21; 320/37
[58] Field of Search ..................... 320/2, 3, 15, 31, 32, 320/33, 37, 38, 61, 62, 63, 41, 42; 180/65.3, 65.4

[56] References Cited

U.S. PATENT DOCUMENTS 3,719,881  3/1973  Shibata et al. ........................ 320/62
3,792,327  2/1974  Waldorf ............................ 320/62 X
4,218,644  8/1980  Bourke et al. ....................... 320/21

Primary Examiner—Steven L. Stephan
Assistant Examiner—Kristine Peckman
Attorney, Agent, or Firm—Beveridge, DeGrandi & Weilacher

[57] ABSTRACT

An electric automobile having a battery as a driving power source is provided with a recharge identification section for producing the first signal when a terminal voltage of the battery reaches the lowest voltage where the automobile can travel, a traveling time judgment section for producing the second signal every time after the automobile has traveled for a predetermined time and a charger responsive to the first and the second signals for recharging the battery for a predetermined time.

9 Claims, 6 Drawing Sheets

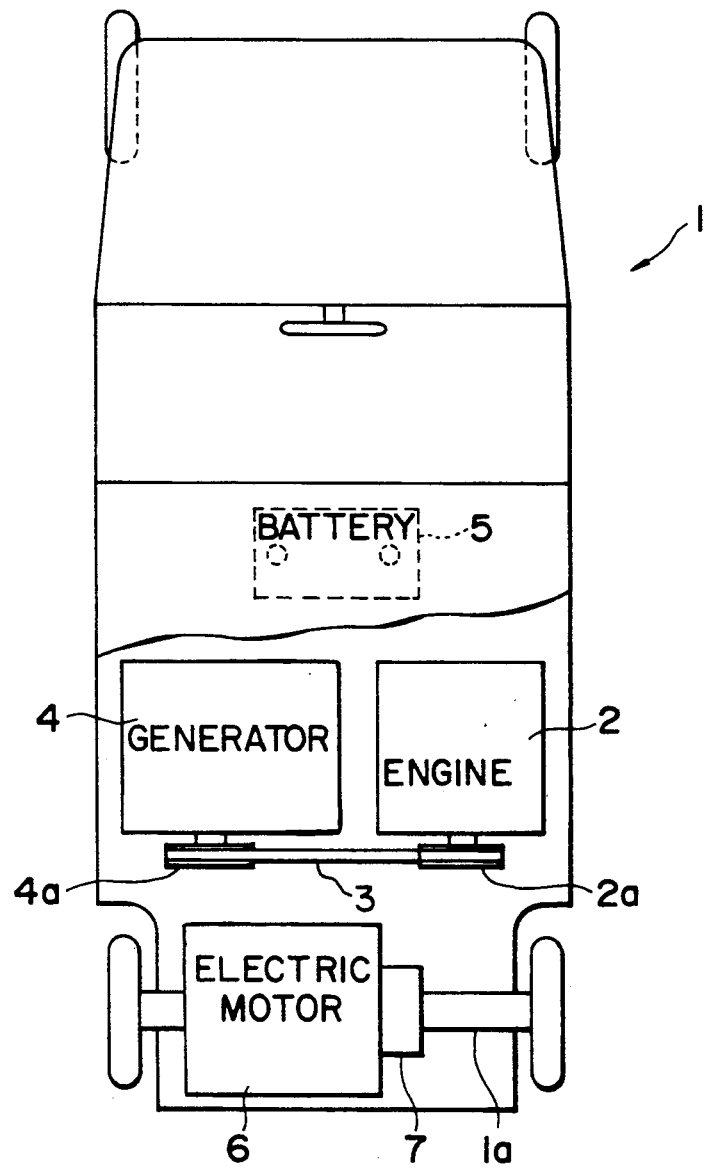
F I G. 1

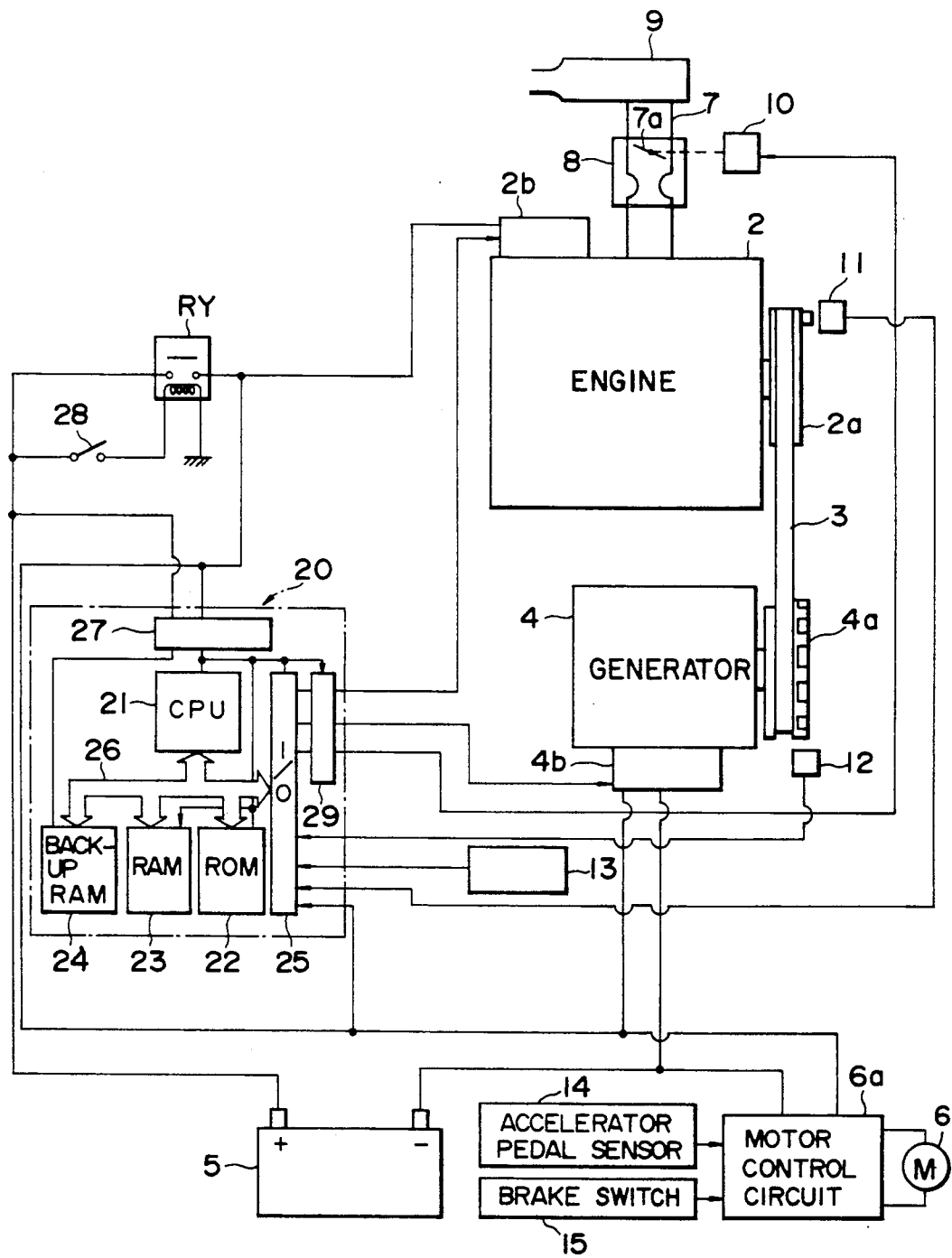
F I G. 2

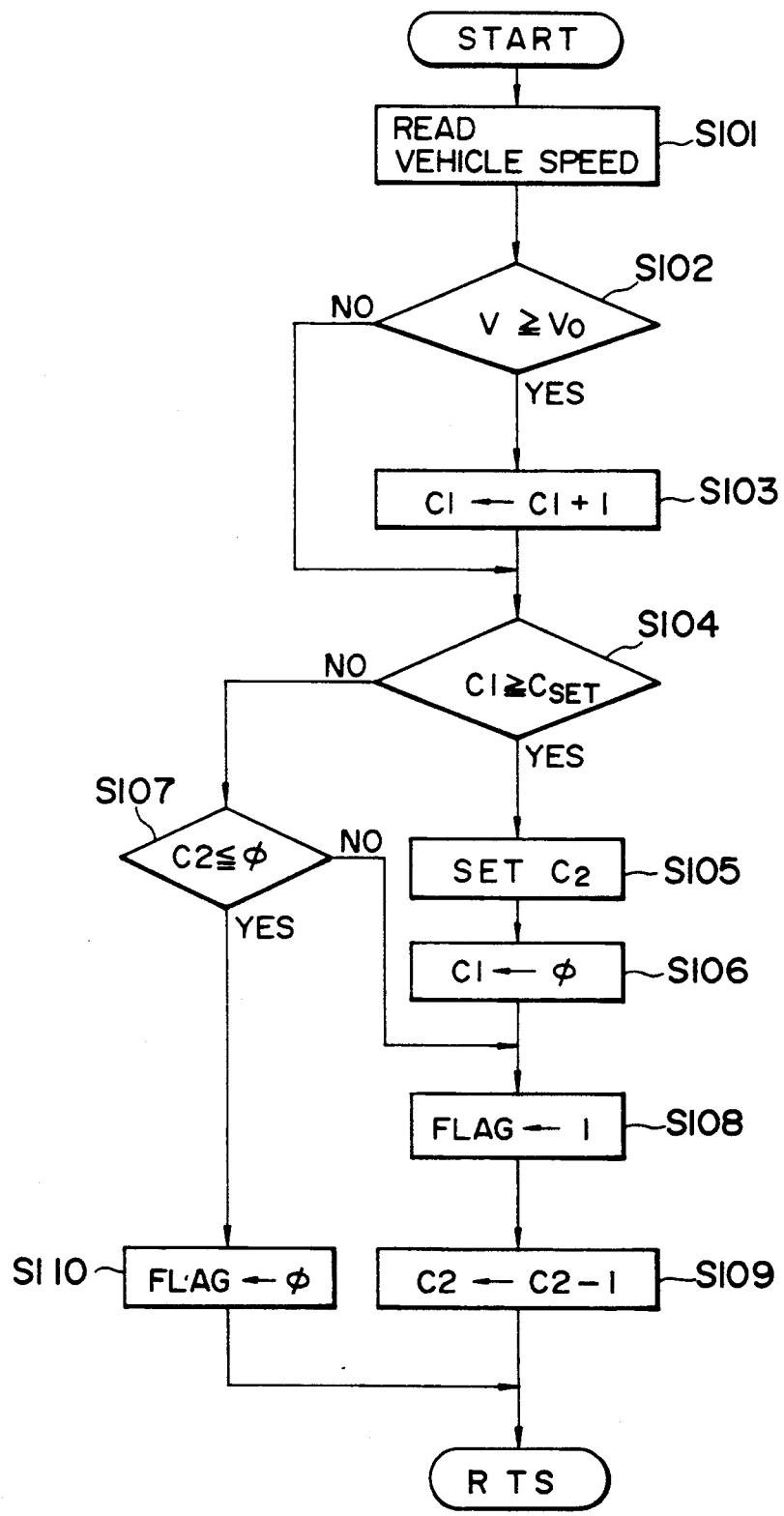
F I G. 6

ELECTRIC AUTOMOBILE

BACKGROUND OF THE INVENTION

The present invention relates to an electric automobile using a battery as a power source.

In recent years, there has been development of the electric automobile that attempt to achieve less environmental pollution without using petroleum fuel. The automobile has a battery that can be recharged by an engine generator. And the automobile runs by an electric motor that uses the battery as the power source. Thus, the electric automobile has a battery and a generator. As a result, weight and space are taken up by an engine that drives the generator.

In order to solve this problem, Japanese Patent Application Laid Open Number 1980-157901 discloses an electric automobile having an engine generator that automatically operates in accordance with the conditions of the battery, and the traveling or stopping condition of the electric vehicle.

In this prior art, the battery is charged when the gravity of the battery liquid becomes lower than a predetermined value or when the vehicle stops. And then, recharging is stopped when the gravity of the battery liquid rises to the predetermined value or when the vehicle travels. Therefore, the space and the weight taken by both the battery and the engine generator become more compact, so that the vehicle becomes lighter and thus performance is improved.

However, a ratio of operating time of the engine generator to traveling time of the vehicle, i.e., an assist ratio must be determined in accordance with the performance of the vehicle, mileage travel distance, the space taken by the engine (the engine weight), battery life, cost, appropriateness with respect to the environment, mental condition of a driver and/or other associated factors. Therefore, battery recharging is needed frequently when the battery is designed smaller and lighter than usual only in consideration of the battery charging condition. In addition such problems as shortened battery life, noise increasing and environmental pollution due to exhaust gas emissions.

SUMMARY OF THE INVENTION

In order to solve the problems in the conventional art, the present invention has an object to provide a suitable recharging system of a battery mounted on an electric automobile, and which can satisfy both traveling performance and cost considerations. And at the same time, the system reduces noise of an engine and environmental pollution due to exhaust gas emissions.

According to the present invention, there is provided an electric automobile having a battery as a driving power source comprising, a recharge identification section for producing a first signal when a terminal voltage of the battery reaches a lowest voltage, traveling time judgment section for producing a second signal every time after the automobile travels for a predetermined set traveling time and a charger responsive to the first and the second signals for recharging the battery for a predetermined recharge time.

The other objects and features of the present invention will become understood from the following description with reference to the accompanying drawings.

BRIEF DESCRIPTION OF THE DRAWINGS

FIG. 1 is a plain view of an automobile according to the present invention;

FIG. 2 is a block diagram of a charging control system according to the present invention;

FIG. 6 is a flowchart that shows a recharge judgment procedure; and

DETAILED DESCRIPTION OF THE PREFERRED EMBODIMENTS

Figure 3:
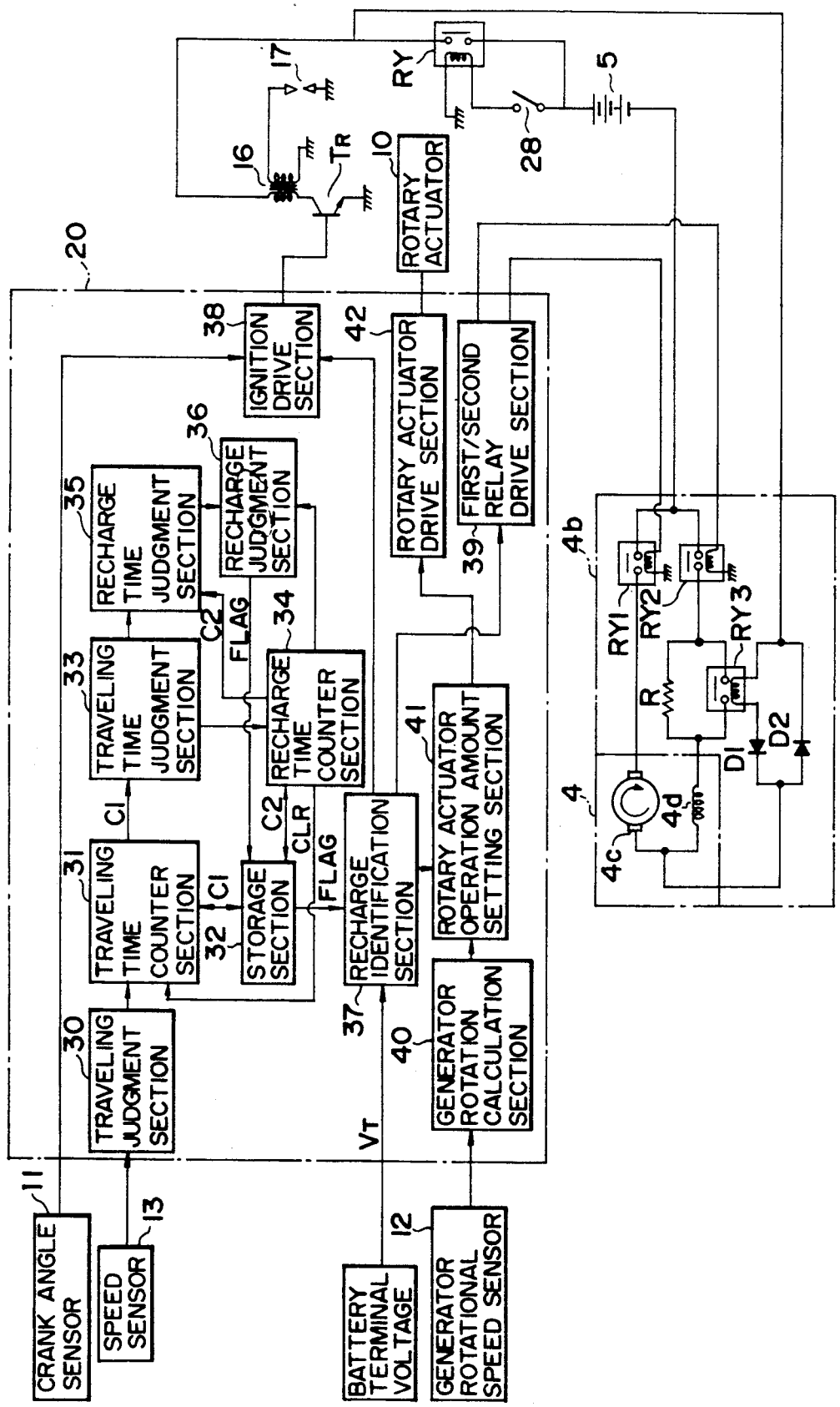
FIG. 3 is a detailed block diagram of an assist device according to the present invention.

The preferred embodiments according to the present invention will be explained in detail with reference to the accompanying drawings.

In FIG. 1, the numeral 1 represents an electric automobile, and a pulley 4a of a generator 4 is linked to a crank pulley 2a of an engine 2 via a belt 3, and an output of the generator 4 recharges a battery 5, and at the same time the generator 4 is also used as a starter when the engine 2 is started. Then, power is supplied to an electric motor 6 from the battery 5, and the power of the electric motor 6 is transmitted to the electric automobile 1 via a gearbox 7.

More specifically, the electric automobile 1 is a so-called serial hybrid automobile in which the output of the engine 2 is converted into electrical energy by the generator 4, and the electric energy stored in the battery 5 is used to drive the electric motor 6 for traveling the automobile.

The engine 2 is a gasoline engine in the present embodiment, and as shown in FIG. 2, a carburetor 8 is mounted to an air intake pipe 7 of the engine 2 and an air cleaner 9 is mounted to an upstream side of the carburetor 8.

Furthermore, a rotary actuator 10 comprising a stepping motor or a rotary solenoid is linked to a throttle valve 7a mounted to the air intake pipe 7.

In addition, a crank angle sensor 11 comprising solenoid pickups is provided as opposing the outer peripheral surfaces of the crank pulley 2a of the engine 2, in order to detect a predetermined crank angle (the fixed ignition angle in the case of the present embodiment).

Furthermore, a generator rotation speed sensor 12 comprising a solenoid pickup is provided as opposing the outer periphery of the pulley 4a of the generator 4.

The numeral 20 represents an assist device comprising a microcomputer, and the assist device 20 is connected to a CPU 21, a ROM 22, a backup RAM 24 and an I/O interface 25 via a bus line 26 and power to each, portion is supplied by a stabilized voltage circuit 27.

This stabilized voltage circuit 27 is connected to a relay contact of a control relay RY connected to a positive terminal of the battery 5 via a key switch 28, and when the key switch 28 is on, control power is supplied to each position and when the key switch 28 is off, backup power is supplied to the backup RAM 24 and the data stored in the backup RAM 24 is held.

In addition, the relay contact of the control relay RY is connected to an igniter 2b, a generator control circuit 4b and a motor control circuit 6a and power is supplied to the relay contact of the control relay 12Y from the battery 5, and furthermore, the motor control circuit 6a is connected to an accelerator pedal sensor 14 and a brake switch 15, and the rotational speed of the motor 6 is controlled in accordance with the accelerator pedal angle signals from the accelerator pedal sensor 14, and the current to the motor 6 is stopped by the brake switch 15.

In addition, the crank angle sensor 11, the generator rotation speed sensor 12 and a speed sensor 13 are connected to input port of the I/O interface 25 and the terminal voltage of the battery 5 is monitored, while on the other hand, the rotary actuator 10, the igniter 2b and a generator control circuit 4b are connected via a drive circuit 29 to output port of the I/O interface 25.

The igniter 2b comprises an ignition coil 16 and such switching device as a transistor TR. As shown in FIG. 3, a positive terminal of a primary side coil of an ignition coil 16 is connected to a relay contact of the control relay RY, and a negative terminal of the primary coil side is connected to a switching transistor TR. Furthermore, a spark plug 17 that has the igniting portion exposed in the combustion chamber of the engine 2 is connected to the secondary coil of the ignition coil 16.

The generator control circuit 4b switches the generator 4 between the starter and the generator and so as shown in FIG. 3, the positive terminal of the battery 5 is connected via the relay contact of the control relay RY to the relay RY3 and furthermore, a diode D1 is connected through this relay RY3 in the forward direction and a diode D2 is connected in the reverse direction in parallel with the relay RY3 and the diode D1.

The diodes D1 and D2 are connected to one of a brush 4c that is connected via a field coil 4d to a resistor R, and furthermore, the negative terminal of the battery 5 is connected via the relay contact of a second relay RY2, while the relay contact of the relay RY3 is connected in parallel with the resistor R. In addition, the other side of the brush 4c is connected via the relay contact of a first relay RY1 to the negative terminal of the battery 5.

Such fixed data (a control program and data for control) is stored in the ROM 22, and in the RAM 23 are stored data resulting from the calculation processing for the output signals from the each of the sensors 11, 12, 13.

In the CPU 21, the signals from each of the sensors are processed in accordance with the control program that is stored in the ROM 22, and the recharge time for the battery 5 is set as the total of the traveling time of the electric automobile 1, with the data stored in the RAM 23 being used as the basis for the calculation of the ignition signals of the engine 2, the control signals to the generator control circuit 4b, and the drive signals for the rotary actuator 10, while the engine 2 is started and the battery 5 is recharged and after a predetermined time has elapsed, the engine 2 is stopped and the recharging is finished. Assist device function configuration As shown in FIG. 3, the configuration of the assist device 20 includes a traveling judgment section 30, a traveling time counter section 31, a storage section 32, a traveling time judgment section 33, a recharge time counter section 34, a recharge time judgment section 35, a recharge judgment section 36, a recharge identification section 37, an ignition drive section 38, a first and a second relay drive section 39, a generator rotation calculation section 40, a rotary actuator operation amount setting section 41, and a rotary actuator drive section 42.

In the traveling judgment section 30, the speed V is read from the speed sensor 13 and this speed V is compared with a reference value V0 (which is 5 km/h, for example), and the electric automobile 1 is judged to be in the standing status when $V < V0$, and to be in the traveling status when $V \geq V0$.

In the traveling time counter section 31, when the traveling judgment section 30 has judged that $V \geq V0$, that is, the electric automobile 1 is traveling, then the counter value C1 of the traveling time counter is incremented ($C1 \leftarrow C1 + 1$) and the traveling time T of the electric automobile 1 is counted.

More specifically, the storage section 32 comprises a predetermined address area in the backup RAM 24 and the ROM 22. The ROM 22 stores a counter setting value CSET corresponding to the traveling time counter section 31, and a counter setting value C2 of the recharge time counter section 34 to be described later. Also, the backup RAM 24 stores the count value C1 of the traveling time counter section 31, the decrement value corresponding to the counter setting value C2 of the recharge time counter section 34, and the recharge judgment flag FLAG to be described later, with these values being held when the key switch 28 is off.

In the traveling time judgment section 33, the counter value C1 of the traveling time counter section 31 is compared with the counter setting value CSET. When $C1 \geq CSET$, the traveling time T of the electric automobile 1 is judged to have reached the predetermined set traveling time TSET (such as 1 hour, for example). On the other hand, when $C1 < CSET$, the traveling time T of the electric automobile 1 is judged to have not reached the set traveling time TSET.

In the recharge time counter section 34, when it is judged that the traveling time T of the electric automobile 1 has reached the predetermined set traveling time TSET, then a counter setting value C2 equivalent to the recharge time TBC of the battery 5 and from the ROM 22 of the storage section 32, is read and set in the recharge time counter section 34, the clear signal CLR is output to the traveling time counter section 31 and the counter value C1 of the traveling time counter section 31 cleared and the recharge time counter section 34 continues to decrement from the counter setting value C2 ($C2 \leftarrow C2 - 1$).

The counter setting value C2 of the recharge time counter section 34 is predetermined so that $C2 = CSET \times K$ (where K is a coefficient), and the value of the coefficient K is selected so that it is within the range of $K = 0.25$ to $0.5$. Accordingly, the recharge time TBC of the battery 5 is set with respect to the set traveling TSET of the electric automobile 1 so that $TBC = TSET \times K$ (where K is from 0.25 to 0.5).

The above coefficient K is the ratio of the recharge time TBC with respect to the set traveling time TSET, namely that is assist ratio. This assist ratio coefficient is set to the optimum value by the relationship between the output of the generator 4 and the power consumed by the electric motor 6 when the automobile is traveling. In addition, there is also the relationship with the current receiving performance of the auxiliary battery. These factors are calculated from the results of tests taking into consideration the weight (the power consumed), the cost, space required, the traveling distance without recharging, the battery life, the environmental appropriateness, driver psychological factors and the like and the optimum value for the assist ratio K determined.

In general, the larger the output of the generator, the smaller the value for the assist ratio K. However, if the output of the generator is too large, then the weight will become excessive and the power consumption will increase, the generator output will increase, the weight will increase, the cost will increase, and the assist ratio K will not become less with respect to the amount of space taken up. In addition, if the output of the generator is too large, then the recharge current will increase and a large battery will become necessary because of the problem of longevity with a small capacity battery. This problem is related to the problem of increased weight in order to have an extended maximum traveling distance, cost increases and a longer recharge time.

Conversely, if the output of the generator is too small, then there will be little effect from reducing the weight, reducing the power consumption by reducing the output, and although there are advantages as far as the cost, the weight and the space taken are concerned, there will be an increase in the recharge time and a reduction in the traveling distance as well as an increase in the assist ratio K.

Not only this, when the assist ratio K is too large, there are associated problems of exhaust emissions, noise, vibration, environmental factors as well as the driver comfort.

Figure 4:
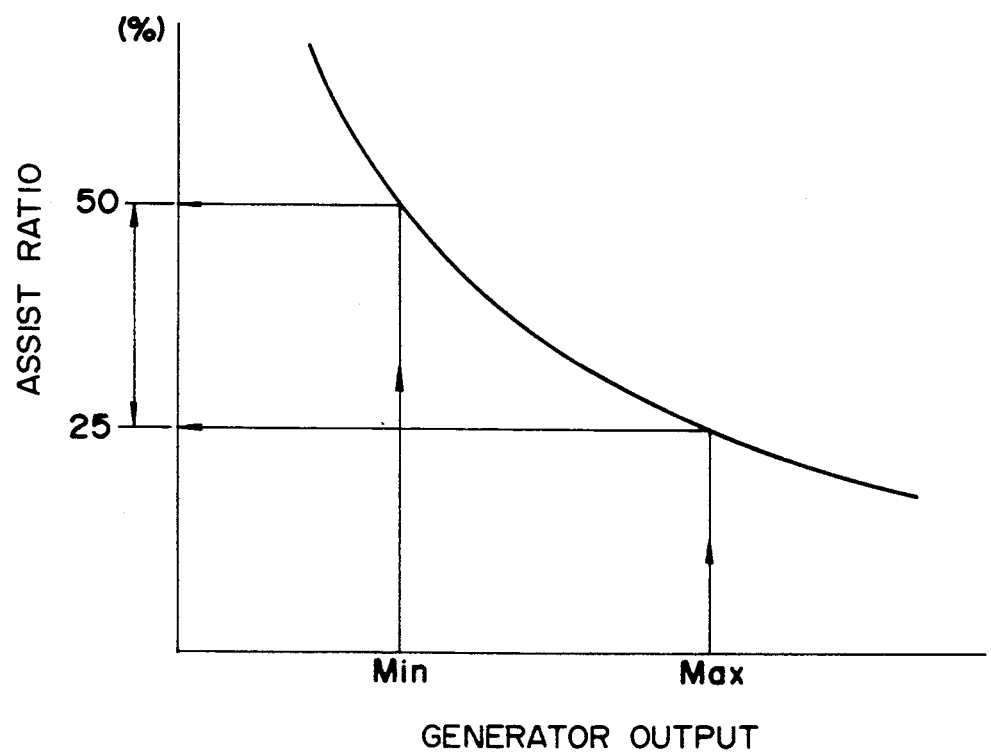
FIG. 4 is a diagram that shows relationships between a generator output and an assist ratio.

As the result of comprehensive testing of all these factors, an optimum value of the assist ratio K was found to be 0.25 to 0.5, as indicated in FIG. 4. In FIG. 4, the maximum required output of the generator is determined from the cost of the generator and the battery, and the space required by the generator and the battery, and the minimum required output is determined from the relationship between the minimum traveling distance and the battery capacity, and the like.

From all this, the traveling performance of the electric automobile 1 can be determined by selecting the battery 5 and the engine 2 that are suitable as far as the cost and the weight are concerned, while at the same time producing a favorable driving sensation.

In the recharge time judgment section 35, if the traveling time T of the electric automobile 1 is judged by the traveling time judgment section 33 to not have reached the set traveling time TSET, then the count value C2 of the recharge time counter section 34 is read from the backup RAM 24 and a judgment made for whether the count value C2 is zero or not, that is, for whether the recharge time TBC of the battery 5 has finished or not.

When countdown of the recharge time counter section 34 begins, the recharge judgment flag FLAG stored in the backup RAM 24 is set to 1 (FLAG←1) in the recharge judgment section 36. On the other hand, when it is judged by the recharge time judgment section 35 that C2 ≦0, that is, the recharge time TBC of the battery 5 has finished, the recharge judgment flag FLAG stored in the backup RAM 24 of the storage section 32 is cleared to zero (FLAG←0).

Figure 5:
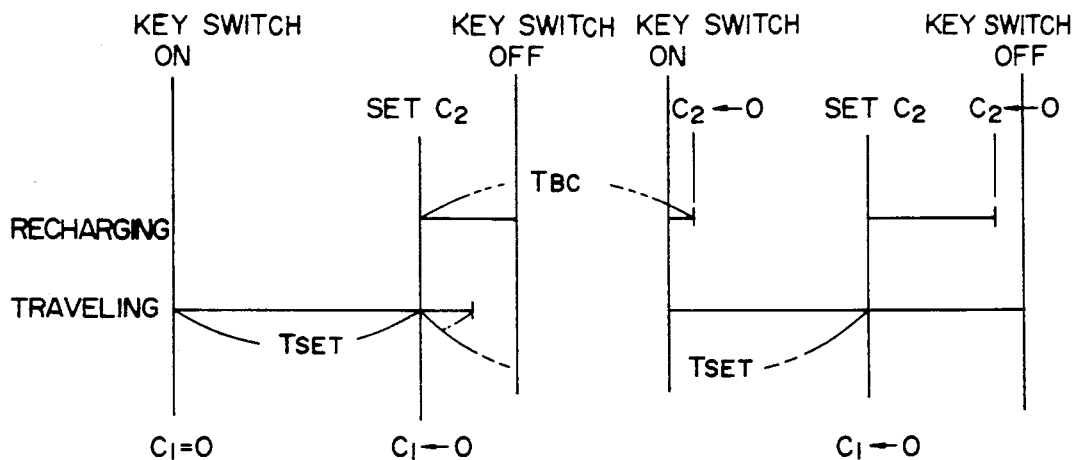
FIG. 5 is a timing chart that shows the relationship between traveling and recharging.

In this case, the countdown values with respect to the count value C1 of the traveling time counter section 31 and the count setting value C2 of the recharge time counter section 34 are successively stored in the backup RAM 24 and are held even when the key switch 28 is off. As shown in FIG. 5, when the key switch 28 is turned on once again, the time according to the traveling time counter section 31 and the recharge time counter 34 is begun from the status when the key switch 28 was turned off.

In the recharge identification section 37, a battery terminal voltage VT is read, and the battery terminal voltage VT is compared with a predetermined upper limit value VH (such as 15 V), and a predetermined lower limit voltage VL (such as 11 V), and if $VL \leq VT \leq VH$, then the recharge judgment flag FLAG stored in the backup RAM 24 of the storage section 32 is read, and when FLAG=1, that is, when there is recharge of the battery 5, operation signals are output to the ignition drive section 38, the first and the second relay drive section 39, and the rotary actuator operation amount setting section 41. When FLAG=0, that is, when the recharge time TBC of the battery 5 has elapsed, operation stop signals are output to the ignition drive section 38, the first and the second relay drive section 39, and the rotary actuator operation amount setting section 41.

In addition, when the recharge identification section 37 judges that VL>VT, operation signals are output to the ignition drive section 38, the first and second relay drive section 39, and the rotary actuator operation amount setting section 41 so as to recharge the battery 5 irrespective of the recharge judgment flag FLAG because the battery terminal voltage has dropped because of discharge of the battery 5 accompanying the traveling of the electric automobile 1. On the other hand if VH<VT, this is to say that when the battery 5 is overcharged, operation stop signals are output to the ignition drive section 38, the first and second relay drive section 39, and the rotary actuator operation amount setting section 41 so as to stop the engine and consequently stop the recharge of the battery 5 in order to prevent gassing of the battery, and wasted fuel through the unnecessary driving of the engine 2.

In the generator rotation calculation section 40, the output signals of the generator rotation speed sensor 12 are read, and the rotation speed NGE of the generator is calculated from the output interval.

In the rotary actuator operation amount setting section 41, amount of operation of the rotary actuator 10 is set so as to correspond to the deviation amount Δ between the generator rotation speed NGE calculated by the generator rotation calculation section 40 and the predetermined objective generator rotational speed Ni (such as 3,000 rpm, for example), and output to the rotary actuator drive section 42.

By the output, the rotary actuator 10 is driven, and degree of opening of the throttle valve of the engine 2 is adjusted so that the generator rotational speed NGE of the generator 4 becomes the objective generator rotational speed Ni. Accordingly, the influence of the slip of the belt 3 is eliminated and the rotational speed of the generator 4 is accurately controlled, so that it is possible to accurately control the recharging of the battery 5.

In the ignition drive section 38, the operation signals from the recharge identification section 37 cause the fixed point ignition angle signals from the recharge identification section 37 to be used as the basis for the predetermined on and off timing of the primary coil of the ignition coil 16 and to spark the spark plug 17. Then, the operation stop signals from the recharge identification section 37 stop the operation and the primary coil of the ignition coil 16 is held in the nonconductive status and the engine 2 is stopped.

At the first and second relay drive section 39, the operation signals from the recharge identification section 37 turn on the first relay RY1 and the second relay RY2 of the control circuit 4b of the generator 4 and operate the generator 4 as a starter. On the other hand, the operation stop signals from the recharge identification section 37 turn off the first relay RY1 and the second relay RY2 and interrupt the connection between the generator 4 and the battery 5 so that the recharging is finished.

More specifically, when the first relay RY1 and the second relay RY2 are turned on while the engine 2 is stopping, a current flows from the battery 5 to the brush 4c via the solenoid coil of the relay RY3 and the diode D1 to turn on the relay RY3. A normally open contact of the relay RY3 is thus closed to form a starter circuit so that a current flows from the brush 4c to the field coil 4d without passing through the resistor R. As a result of this, the generator 4 starts the engine 2 through the belt 3 because the generator 4 is rotated by the current flowing through the field coil 4d.

Then, when the engine 2 has started and the rotational speed is risen, the current passing through the starter circuit is gradually reduced and the relay RY3 is turned off when the current has reached zero.

Furthermore, when the rotational speed of the engine 2 rises, current begins to flow in the reverse direction from the field coil 4d and via the resistor R, passes through the diode D2 and recharges the battery 5.

After this, when the first relay RY1 and the second relay RY2 are turned off, the connection between the generator 4 and the battery 5 is interrupted and the recharging stops.

Function

The following is a description of the operation of an embodiment having the configuration described above, FIG. 6 is a flow chart indicating the recharge judgment procedure, which is an interrupt program that is executed for each predetermined time when the key switch 28 is turned on.

First, in a step S101, the vehicle speed V is read from the speed sensor 13, and then, in a step S102, the vehicle speed V that was read in the step S101 is compared with a predetermined reference speed V0 (such as 5 km/h).

In the step S102, when $V < V0$, the electric automobile 1 is judged to be in the standing and the program jumps to a step S104, and if $V \geq V0$, it is judged that the vehicle is in the traveling status and the program proceeds to a step S103.

In the step S103, the count value C1 of the traveling time counter section 31 is counted up (C1←C1 +1). Then, the program proceeds to the step S104 where the count value C1 of the traveling time counter section 31 and the count setting value CSET are compared. When $C1 \geq CSET$, it is judged that the traveling time T of the electric automobile 1 has reached the predetermined set traveling time TSET (such as 1 hour, for example) and the program proceeds to a step S105.

In the step S105, the count setting value C2 corresponding to the recharge time TBC of the battery 5 is read from the predetermined address of the ROM 22 and set in the recharge time counter section 34.

Then, in a step S106, the count value C1 of the traveling time counter section 31 is cleared (C1←0) and the execution proceeds to a step S108.

On the other hand, in the step S104, when $C1 < CSET$, it is judged that the traveling time T of the electric automobile 1 has not reached the set traveling time TSET, the program jumps from the step S104 to a step S107. The count value of the recharge time counter section 34 is read from a predetermined address in the backup RAM 24 and a judgment is made for whether C2 is zero or not in the step S107.

In the step S107, when $C2 > 0$, that is, if the recharge time counter section 34 is currently counting, the program proceeds from the step S107 to the step S108. On the other hand, if $C2 \leq 0$ in the step S107, that is, when the time of the recharge time TBC of the battery 5 has finished, the program jumps from the step S107 to a step S110 where the recharge judgment flag FLAG stored in the backup RAM 24 is cleared (FLAG←0) and there is an escape from the program.

In the step S108, the recharge judgment flag FLAG stored in the backup RAM 24 is set to 1 (FLAG←1) and then in a step S109, the recharge time counter section 34 is counted down from the count value C2 (C2←C2−1) and there is escape from the program.

Figure 7:
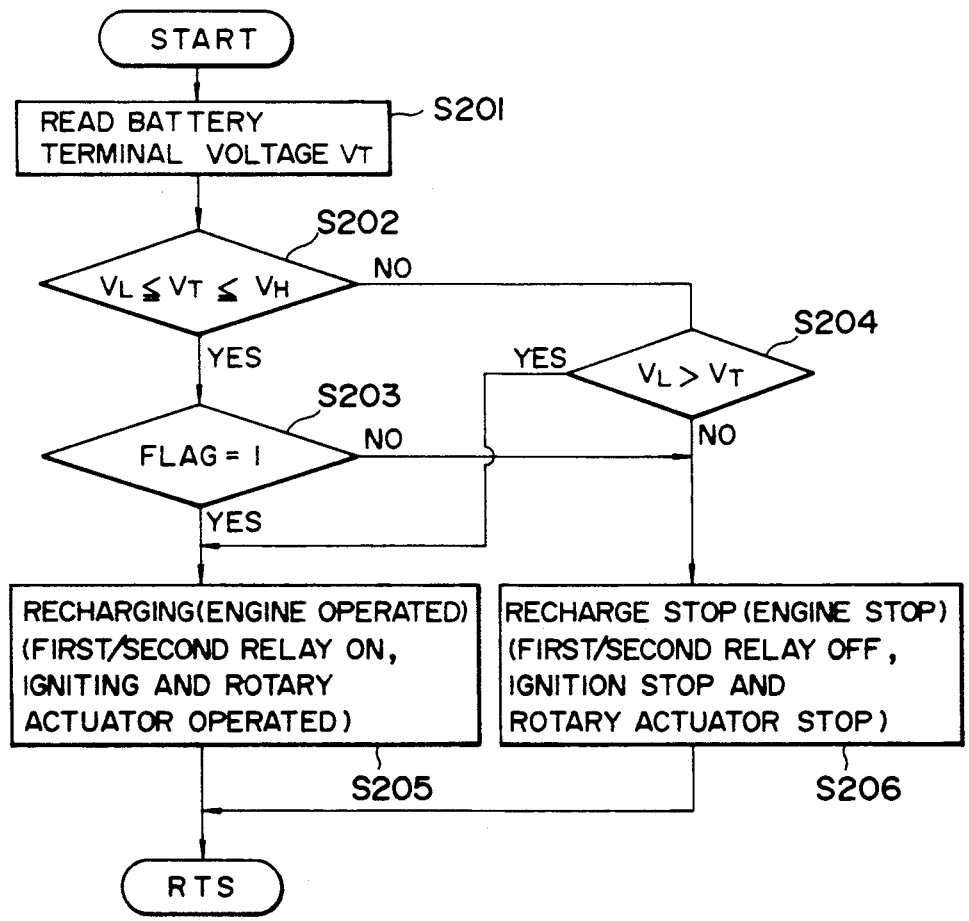
FIG. 7 is a flowchart that shows a recharge control procedure.

The following is a description of the flowchart shown in FIG. 7 for the recharge control procedures.

The recharge control procedure program is the same as the program for the recharge judgment section 36 described above, i.e., the execution at predetermined times when the key switch 28 is turned on is an interrupt program.

First, in a step S201, the battery terminal voltage VT is read, and in a step S202, there is a judgment for whether the battery voltage VT is within the range set beforehand by the lower limit voltage VL (such as 11 V, for example) and the upper limit voltage VH (such as 15 V, for example). The program proceeds to a step S203, if $VL \leq VT \leq VH$, where the recharge judgment flag FLAG is read from a predetermined address in the backup RAM 24 and a judgment is made as to whether the battery 5 is recharged or not.

If the recharge judgment flag FLAG is FLAG=1, that is, when there is recharge, the program proceeds from the step S203 to a step S205. In the step S205, the first relay RY1 and the second relay RY2 of the generator control circuit 4b are turned on, and the ignition signals are output to the igniter 2b. Furthermore, the rotary actuator 10 is driven to control the rotational speed of the generator 4 so that it becomes a predetermined rotational speed and there is an escape from the program.

Moreover, when there is recharge performed from the status where the recharge is completed, the signals to the generator control circuit 4b and the igniter 2b cause the generator 4 to operate as a starter, so that recharge operation by the engine 2 is begun.

On the other hand, in the step S203, when FLAG=0, that is, when there is not recharge, the program jumps from the step S203 to a step S206. In the step S206, the fist relay RY1 and the second relay RY2 of the generator control circuit 4b are turned off, the ignition signals to the igniter 2b are cut and further the drive of the rotary actuator 10 is stopped to make the throttle valve 7a be placed in the fully open status so as to stop the engine 2. Then, there is an escape from the program.

On the other hand, in the step S202, when it is judged that $VL > VT$, or that $VH < VT$, the program proceeds to a step S204. In the step S204, the battery terminal voltage VT that was read in the step S201 is compared with the lower limit value VL. When $VL > VT$, that is, when the battery voltage has dropped due to discharge of the battery 5, the program proceeds from the step S204 to a step S205. In the step S205, the engine 2 is operated to recharge the battery 5 irrespective of the recharge judgment flag FLAG and there is an escape from the program.

In addition, when VL≦VT in the step S204, that is, when it is judged that VH<VT, the program proceeds to a step S206. In the step S206, the engine 2 is stopped to finish the recharging of the battery 5 in order to prevent the occurrence of gassing, the generation of noise and the waste of fuel due to overcharging of the battery 5 and there is an escape from the program.

Moreover, the present invention is not limited to the embodiment described above, as the electric automobile 1 can also be driven by a combination of the electric motor 6 and the engine 2.

In addition, the recharge time TBC of the battery 5 can be calculated so that there is predetermined coefficient K with respect to the traveling time T of the electric automobile 1. In this case, for example, the traveling set time TSET can be in accordance with the terminal voltage of the battery 5. Furthermore, the assist device 20 needs not be dependent upon a microcomputer, but can be alternatively configured from a hard logic circuit, and the time of the recharge time TBC of the battery 5 and the traveling time of the electric automobile 1 can be either counted down or counted up.

According to the present invention as described above, there is provided the assist device that recharges the battery for the recharge time that is the predetermined ratio with respect to the traveling time of the vehicle that has the battery as of the driving power source. Therefore, it is possible to have suitable recharging for the battery with respect to the traveling performance of the electric automobile. In this case, it is desirable that the predetermined ratio set between 25% and 50%, and therefore achieve an optimum balance between the cost, weight and traveling performance of the electric automobile.

More specifically, it is possible to establish both traveling performance and cost benefits and at the same time improve the drive feeling and promote durability of the battery. Still furthermore, there is also an effect of enabling the prevention of environmental pollution due to the noise and the exhaust gas emissions of the engine/generator used to recharge the battery.

While the presently preferred embodiments of the present invention have been shown and described, it is to be understood that the disclosures are for the purpose of illustration and that various changes and modifications may be made without departing from the scope of the invention as set forth in the appended claims.

What is claimed is:

1. An electric automobile vehicle having, a battery as a drive power source, a generator for generating an electric power, an engine for driving said generator for charging said battery, a speed sensor for sensing a vehicle speed and a generator speed sensor for detecting a rotational speed of the generator, comprising:
   recharge identification means for detecting a charging condition of the battery and for producing a first signal when a terminal voltage of the battery reaches a predetermined lower limit voltage;
   traveling time judgment means for detecting a traveling time of the automobile and for producing a second signal every predetermined set traveling time for which the automobile has traveled; and
   recharge means responsive to at least one of said first signal and said second signal for recharging the battery.

2. The vehicle according to claim 1, wherein said recharge means recharges the battery for a predetermined recharge time which is set in a predetermined ratio with respect to the traveling time.

3. The vehicle according to claim 2, wherein said predetermined ratio is within the range of 25% to 50%.

4. The vehicle according to claim 1, wherein said recharge identification means supplies a third signal to said recharge means so as to stop the recharge when the terminal voltage is higher than a predetermined upper limit voltage.

5. An electric automobile vehicle having, a battery as a drive power source, a generator for generating an electric power, an engine for driving said generator for charging said battery and a speed sensor for sensing a vehicle speed, comprising:
   traveling judgment means for judging a traveling condition of said automobile when said vehicle speed is larger than a preset speed;
   traveling time counting means for counting a traveling time of said vehicle while said traveling condition is judged and for producing a first signal every predetermined set traveling time for which said automobile has traveled;
   recharging means responsive to said first signal for recharging said battery for a predetermined recharge time by driving said engine.

6. The vehicle according to claim 5, wherein said recharging means comprises:
   recharge time counting means responsive to said first signal for starting to count a recharge time of said battery;
   recharge time judgment means for comparing said recharge time with said predetermined recharge time to judge whether said recharge time reaches said predetermined recharge time; and
   recharge identification means for producing an operation signal to drive said engine for the recharge of said battery until said recharge time reaches said predetermined recharge time and for producing a stop signal to stop said engine after said recharge time reaches said predetermined recharge time.

7. The vehicle according to claim 6, having a battery terminal voltage sensor for sensing a battery terminal voltage, wherein said recharge identification means compares said battery terminal voltage with a predetermined lower limit voltage and produces said operation signal irrespective of said recharge time when said battery terminal voltage is lower than said predetermined lower limit voltage, thereby preventing the discharge of the battery.

8. The vehicle according to claim 6, having a battery terminal voltage sensor for sensing a battery terminal voltage, wherein said recharge identification means compares said battery terminal voltage with a predetermined upper limit voltage and produces said stop signal irrespective of said recharge time when said battery terminal voltage is higher than said predetermined upper limit voltage, thereby preventing gassing of the battery.

9. The vehicle according to claim 6, having a generator rotational speed sensor for detecting a rotational speed of the generator and relay means for controlling the rotation of said generator, wherein said recharging means further comprises:
   ignition drive means responsive to said operation signal for igniting an ignition plug of said engine;

relay drive means responsive to said operation signal for changing the status of said relay means to impose said generator to charge said battery; and rotary actuator operation amount setting means responsive to said operation signal for setting an operation amount of a rotary actuator which actuates a throttle valve of said engine, so as to converge said rotational speed of the generator to a predetermined rotational speed.

* * * * *